United States Patent Office 3,639,509
Patented Feb. 1, 1972

3,639,509
SHAPED ARTICLES ON THE BASIS OF
POLYVINYL CHLORIDE
Hans-Joachim Andrascheck and Erich Zentner, Burgkirchen (Alz), Germany, assignors to Farbwerke Hoechst Aktiengesellschaft vormals Meister Lucius & Bruning, Frankfurt am Main, Germany
No Drawing. Filed May 5, 1969, Ser. No. 821,994
Claims priority, application Germany, May 17, 1968,
P 17 69 390.2
Int. Cl. C08f 41/12, 29/22
U.S. Cl. 260—876 R                12 Claims

ABSTRACT OF THE DISCLOSURE

The invention relates to shaped articles on the basis of polyvinyl chloride having a high transparency, high thermal stability under load, good deep drawing properties and a high impact strength. The shaped articles consist mainly of a copolymer of predominant proportions of vinyl chloride and certain N-substituted maleic acid imides, smaller proportions of known elastomers on the basis of butadiene and styrene, and optionally, certain proportions of a graft copolymer of vinyl chloride on a butadiene elastomer.

---

The present invention relates to shaped articles on the basis of polyvinyl chloride having improved properties.

When polymers of vinyl chloride produced by emulsion, suspension or mass polymerizaation are processed on a calender or extruder shaped articles are obtained having a good translucency to a high transparency, whereas other properties such as suitability for deep drawing, thermal stability under load, and impact strength are insufficient for many fields of application.

To improve simultaneously all these properties various proposals have been made. To produce polyvinyl chloride semi-finished goods with improved heat resistance afterchlorinated polyvinyl chloride obtained by suspension or mass polymerization or chlorinated polyolefins or polyvinyl chloride prepared by deep temperature polymerization are being used. As compared with pure polyvinyl chloride, products made from the said polymers have a higher thermal stability under load but in many cases their deep drawing properties and impact strength are not sufficient. Moreover, their appearance (surface and transparency) does not satisfy the demands made, for example, on transparent packing materials.

To contribute to the solution of this problem attempts have also been made to obtain products having a higher thermal stability under load and simultaneously an improved suitability for deep drawing and impact strength by copolymerizing vinyl chloride for example with vinyl acetate, styrene, ethylene, propylene, methylmethacrylate and acrylonitrile. For a better impact strength graft polymerization with butadiene-containing elastomers has also been taken in consideraation. It has not been possible, however, to produce shaped articles in which all three properties are improved.

It has furthermore been proposed to use polymer mixtures, i.e. polyblends, for the manufacture of polyvinyl chloride shaped articles, for example blends of polyvinyl chloride obtained by emulsion, suspension or mass polymerization, or of copolymers of vinyl chloride and vinyl acetate with polyethylene, polypropylene, polystyrene, chlorinated polyolefins, polymethylmethacrylate and copolymers, for example commercial products on the basis of acrylonitrile/butadiene/styrene (ABS) or methylmethacrylate/butadiene/styrene (MBS). None of the polyblends of this kind yields polyvinyl chloride semi-finished goods having all the desired physical properties (transparency, good suitability for deep drawing, thermal stability under load and impact strength).

It has now been found that shaped articles on the basis of polyvinyl chloride having a high transparency and thermal stability under load combined with excellent deep drawing properties and a good impact strength, which articles are characterized by (1) a transparency of 8–10‰ (according to DIN 53490)
(2) a thermal stability under load of at least 90° C. (according to DIN 53445)
(3) deep drawing properties in a processing range of at least 120 centigrades of temperature difference with a deep drawing ratio $H:D$ of 1:1.5) and
(4) an impact strength of at least 400 cm. kp./cm.$^2$ (according to DIN 53448)

can be obtained by mixing moulding compositions comprising (a) 75 to 98 parts by weight of a copolymer of 85 to 99% by weight of vinyl chloride and 1 to 15% by weight of a maleic imide of the general formula

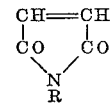

in which R stands for an aliphatic or cycloaliphatic hydrocarbon radical having 3 to 12 carbon atoms, at least one of which being a tertiary or quaternary carbon atom,
(b) 10 to 25 parts by weight of a graft copolymer of more than 50% by weight of vinyl chloride and less than 50% by weight of a known elastomer of butadiene, methylmethacrylate and styrene or of butadiene and acrylonitrile, or of butadiene, butylacrylate and styrene and
(c) 2 to 15 parts by weight of a known elastomer of butadiene, styrene and either acrylonitrile or methylmethacrylate with known stabilizers and lubricants and subjecting the mixture obtained to a known calendering or extrusion process.

The shaped articles according to the invention may also be made from components (a) and (c) or (a) and (b) only.

Component (a) is prepared in known manner by copolymerizing in suspension, emulsion or in the mass vinyl chloride and 1 to 15, preferably 4 to 9% by weight, calculated on the copolymer, of a maleic imide of the indicated formula. The copolymers have a K value in the range of from 55 to 70, preferably 58 to 60. From among the maleic imides suitable to produce the moulding compositions for the manufacture of the shaped artices of the invention N-cyclohexyl and N-tert.-butyl maleic imide are preferred.

Component (b) is prepared by grafting preponderant proportions of vinyl chloride on a known elastomer of butadiene, methylmethacrylate and styrene or of butadiene and acrylonitrile or of butadiene butylacrylate and styrene. The vinyl chloride is preferably polymerized in aqueous emulsion until a conversion of 60, advantageously 70 to 85% is reached and the elastomer is then mixed in the form of a latex whereupon polymerization is continued. A suitable elastomer is, for example, a copolymer of 52% by weight of butadiene, 31% by weight of styrene and 17% by weight of methylmethacrylate or butyl acrylate.

A special advantage of the mixtures of the invention resides in the fact that within the specified limits the proportions of the components can be largely varied so that also the impact strength can be adjusted to definite values without the excellent deep thawing properties, the high thermal stability under load and the transparency being noticeably impaired.

To stabilize the mixture specified above there can be used known stabilizer systems, for example compounds on the basis of organo-tin compounds such as di-n-octyltin-bis-thioglycolic acid isooctyl ester or butyl thiostannoic acid, optionally in combination with phenols or phenol derivatives, barium/cadmium salts, calcium/zinc salts of saturated or unsaturated aliphatic carboxylic acids, for example calcium/zinc stearate or oleate, and aminocrotonic acid esters, diphenyl thiourea, organic phosphites, phenol derivatives alone or in known combinations.

Suitable lubricants are, for example, montan waxes, higher fatty acids and the esters thereof, as well as amide waxes, which are used in known manner.

The components to be used according to the invention are mixed in a known fluid mixer or kneader until a homogenous polyvinyl chloride composition is obtained.

Shaping of the compositions to polyvinyl chloride semi-finished goods, for example films, is performed by known methods, on calenders or extruders.

The differences in properties of the shaped articles made from the compositions of the invention in comparison with known mixtures are illustrated with 7 calendered films. The 7 films having the compositions indicated in the following examples were produced by first mixing the cold components, in known manner, gelatinizing the mixtures in plastificators such as heated mixers, kneaders and mixing rolls, homogenizing them and processing them into films of equal cross section on conventional calenders with any desired arrangement of the rolls.

The films obtained from the compositions according to the invention have excellent deep drawing properties and a high thermal stability under load and are, therefore, especially suitable for processing on high speed deep drawing packaging machines.

The following examples serve to illustrate the invention but they are not intended to limit it thereto, the parts being by weight unless otherwise stated.

In comparative Examples I to III and Examples 1 to 4 according to the invention there were used 1.5 parts of di-n-octyltin bis-thioglycolic acid isooctyl ester as stabilizer and 1.0 part of montan wax as lubricant, calculated on the compositions.

COMPARATIVE EXAMPLE I

The film was made from 100 parts of suspension polyvinyl chloride having a K value of 60. It had the following properties:

(a) a moderate suitability for deep drawing
(b) a moderate thermal stability under load
(c) a high transparency
(d) a moderate impact strength.

The impact strength of the film could be improved by adding, for example, an acrylonitrile/butadiene/styrene elastomer (ABS), without the deep drawing properties, the transparency and the thermal stability under load being noticeably modified.

COMPARATIVE EXAMPLE II

The film was made from 80 parts of a suspension copolymer of

90% by weight of vinyl chloride and 10% by weight of vinyl acetate having a K value of 60,
20 parts of an emulsion graft copolymer of
75% by weight of vinyl chloride and 25% by weight of an elastomer of 52% by weight of butadiene, 31% by weight of styrene and 17% by weight of methylmethacrylate prepared as described above.

The film had the following properties:

(a) good deep drawing properties
(b) a moderate thermal stability under load
(c) a good transparency
(d) a good impact strength

COMPARATIVE EXAMPLE III

The film was made from 92 parts of a suspension copolymer as specified in comparative Example II and
8 parts of a commercial ABS modifier (acrylonitrile/butadiene/styrene elastomer)

The properties of the film were practically identical with those of the film of comparative Example II.

EXAMPLE 1

The film was made from 80 parts of a suspension polyvinyl chloride copolymer containing 7% of N-cyclohexyl-maleic imide and having a K value of 60,
20 parts of an emulsion graft copolymer of the composition specified in comparative Example II to improve the impact strength.

The film obtained had the following properties:

(a) excellent deep drawing properties
(b) very high thermal stability under load
(c) high transparency
(d) good impact strength.

The impact strength could be further improved by using a graft polymer with a higher proportion of elastomer, without the other properties being modified.

EXAMPLE 2

The film was made from 92 parts of suspension polyvinyl chloride copolymer containing 7% of N-tert. butyl maleic imide and having a K value of 60,
8 parts of a conventional agent to improve the impact strength (as used in comparative Example III).

The film obtained had practically the same properties as the film of Example 1.

EXAMPLE 3

A film was made from 83 parts of a suspension polyvinyl chloride copolymer with 5% by weight of N-cyclohexyl-maleic imide having a K value of 62,
15 parts of a graft copolymer of 80% by weight of vinyl chloride and 20% by weight of the elastomer used in comparative Example II,
2 parts of a conventional agent to improve the impact strength as used in comparative Example II.

The film obtained had the following properties:

(a) excellent deep drawing properties
(b) high thermal stability under load
(c) very high transparency
(d) good impact strength.

EXAMPLE 4

A film was made from 90 parts of a mass polyvinyl chloride copolymer containing 9% by weight of N-cyclohexyl-maleic imide and having a K value of 60, which compolymer had been prepared at a polymerization temperature of +10° C.
10 parts of the graft copolymer as used in Example 3.

The film obtained had the following properties:

(a) excellent deep drawing properties
(b) very high thermal stability under load
(c) high transparency
(d) good impact strength.

The properties of the films obtained are summarized in the following table

TABLE

| Example No. | Processing range, °C., for deep drawing [1] | Thermal stability under load, °C., DIN 53445 | Transparency turbidity number in °/oo DIN 53490 | Impact strength DIN 53448 cm. kp./cm.[2] |
|---|---|---|---|---|
| I | 100–125 | 80 | 8–10 | 350 |
| II | 100–140 | 75 | 10–13 | 450 |
| III | 100–140 | 75 | 8–10 | 450 |
| 1 | 95–230 | 90 | 8–10 | 450 |
| 2 | 95–230 | 90 | 8–10 | 450 |
| 3 | 100–220 | 88 | 8–10 | 430 |
| 4 | 90–230 | 93 | 8–10 | 400 |

[1] Deep drawing ratio H: D=1: 1.5.

What is claimed is:
1. A shaped article having
   (1) a transparency of 8 to 10% when tested according to DIN 53490,
   (2) a thermal stability under load of at least about 90° C. when tested according to DIN 53445,
   (3) deep drawing properties in a processing range of at least 120 centigrades temperature difference with a deep drawing ratio $H:D$ of 1:1.5 and
   (4) an impact strength of at least 400 cm. kp./cm.$^2$ when tested according to DIN 53448,
said article consisting essentially of
   (a) from 75 to 98 parts by weight of a copolymer of 85 to 99% by weight of vinyl chloride and 1 to 15% by weight of a maleic imide of the formula:

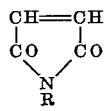

wherein R stands for an aliphatic or cycloaliphatic hydrocarbon radical having 3 to 12 carbon atoms, at least one carbon atom of which being a tertiary or quaternary carbon atom,
   (b) from 10 to 25 parts by weight of a graft copolymer of more than 50% by weight of vinyl chloride onto less than 50% by weight of an elastomer of butadiene, methylmethacrylate and styrene; butadiene and acrylonitrile; or butadiene, butyl acrylate and styrene, and
   (c) from 2 to 15 parts by weight of an elastomer of butadiene, styrene and either acrylonitrile or methylmethacrylate.

2. A shaped article having
   (1) a transparency of 8 to 10‰ when tested according to DIN 53490,
   (2) a thermal stability under load of at least about 90° C. when tested according to DIN 53445,
   (3) deep drawing properties in a processing range of at least 120 centigrades temperature difference with a deep drawing ratio $H:D$ of 1:1.5 and
   (4) an impact strength of at least 400 cm. kp./cm.$^2$ when tested according to DIN 53448,
said article consisting essentially of
   (a) from 75 to 98 parts by weight of a copolymer of 85 to 99% by weight of vinyl chloride and 1 to 15% by weight of a maleic imide of the formula:

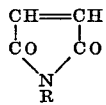

wherein R stands for an aliphatic or cycloaliphatic hydrocarbon radical having 3 to 12 carbon atoms, at least one carbon atom of which being a tertiary or quaternary carbon atom, and
   (b) from 2 to 15 parts by weight of an elastomer of butadiene, styrene and either acrylonitrile or methylmethacrylate.

3. A shaped article having
   (1) a transparency of 8 to 10‰ when tested according to DIN 53490,
   (2) a thermal stability under load of at least about 90° C. when tested according to DIN 53445,
   (3) deep drawing properties in a processing range of at least 120 centigrades temperature difference with a deep drawing ratio $H:D$ of 1:1.5 and
   (4) an impact strength of at least 40 cm. kp./cm.$^2$ when tested according to DIN 53448,
said article consisting essentially of
   (a) from 75 to 98 parts by weight of a copolymer of 85 to 99% by weight of vinyl chloride and 1 to 15% by weight of a maleic imide of the formula:

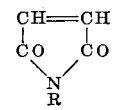

wherein R stands for an aliphatic or cycloaliphatic hydrocarbon radical having 3 to 12 carbon atoms, at least one carbon atom of which being a tertiary or quaternary carbon atom, and
   (b) from 10 to 25 parts by weight of a graft copolymer of more than 50% by weight of vinyl chloride onto less than 50% by weight of an elastomer of butadiene, methylmethacrylate styrene; butadiene and acrylonitrile; or butadiene, butyl acrylate and styrene.

4. An article as claimed in claim 1, wherein component (a) contains 4 to 9% by weight of maleic imide, calculated on the copolymer.

5. An article as claimed in claim 2, wherein component (a) contains 4 to 9% by weight of maleic imide, calculated on the copolymer.

6. An article as claimed in claim 1, wherein component (a) contains N-cyclohexyl maleic imide or N-tert. btuyl maleic imide.

7. An article as claimed in claim 2, wherein component (a) contains N-cyclohexyl maleic imide or N-tert.butyl maleic imide.

8. An article as claimed in claim 3, wherein component (a) contains 4 to 9% by weight of maleic imide, calculated on the copolymer.

9. An article as claimed in claim 3, wherein component (a) contains N-cyclohexyl maleic imide or N-tert. butyl maleic imide.

10. An article as claimed in claim 1 which additionally contains a stabilizer and a lubricant.

11. An article as claimed in claim 2 which additionally contains a stabilizer and a lubricant.

12. An article as claimed in claim 3 which additionally contains a stabilizer and a lubricant.

References Cited

UNITED STATES PATENTS

| 2,342,295 | 2/1944 | Orthner et al. | 260—780 X |
| 2,802,809 | 8/1957 | Hayes | 260—876 X |
| 3,281,345 | 10/1966 | Kühne | 260—876 X |
| 3,444,267 | 5/1969 | Beer | 260—876 |
| 3,444,269 | 5/1969 | Beer | 260—876 |

MURRAY TILLMAN, Primary Examiner

H. ROBERTS, Assistant Examiner

U.S. Cl. X.R.

260—23.7 H, 28.5 BD, 45.7 P, 45.75 K, 45.9 R, 78 UA, 78.5 R, 890, 891